(12) United States Patent
Scholen et al.

(10) Patent No.: US 7,549,925 B2
(45) Date of Patent: Jun. 23, 2009

(54) ELECTRONIC PRODUCT DISPLAY SYSTEM (75) Inventors: Jonah M. Scholen, Minneapolis, MN (US); Blake Nielsen, Schaumberg, IL (US); Raul S. Romerio, Ajax (CA); Aaron Guiden, Fraserville (CA)

(73) Assignee: Target Brands, Inc., Minneapolis, MN (US)

( * ) Notice: Subject to any disclaimer, the term of this patent is extended or adjusted under 35 U.S.C. 154(b) by 873 days.

(21) Appl. No.: 10/958,206

(22) Filed: Oct. 4, 2004

(65) Prior Publication Data

US 2006/0084508 A1 Apr. 20, 2006

(51) Int. Cl.
  *A63F 9/24* (2006.01)
  *A63F 13/00* (2006.01)
  *G06F 17/00* (2006.01)
  *G06F 19/00* (2006.01)
  *A47G 29/00* (2006.01)
  *A47B 91/00* (2006.01)

(52) U.S. Cl. .............................. 463/46; 463/1; 211/84; 312/351.6

(58) Field of Classification Search ............. 463/1, 463/46; 312/351.6; 211/84
See application file for complete search history.

(56) References Cited

U.S. PATENT DOCUMENTS

| | | | |
|---|---|---|---|
| 1,044,471 A * | 11/1912 | Andrews ................ 211/84 |
| 2,203,240 A * | 6/1940 | Tipton ................... 217/8 |
| 2,584,173 A * | 2/1952 | Van Fowler ............. 312/303 |
| D179,235 S | 11/1956 | Anderson |
| 4,084,194 A | 4/1978 | Hector |
| D248,885 S | 8/1978 | Pogue |
| 4,245,871 A | 1/1981 | Rex |
| 4,440,457 A | 4/1984 | Fogelman et al. |
| 4,591,215 A * | 5/1986 | Robbins ................ 312/234.3 |
| 4,827,439 A | 5/1989 | Licht |
| 5,169,221 A * | 12/1992 | Wheeler ................ 312/323 |
| D338,492 S | 8/1993 | McNall et al. |
| 5,281,018 A | 1/1994 | Cullinan |
| D361,095 S | 8/1995 | O'Donnell |
| 5,663,746 A | 9/1997 | Pellenberg et al. |
| D415,330 S | 10/1999 | King |
| 6,048,043 A | 4/2000 | Kaspar |
| D434,582 S | 12/2000 | Heiny et al. |
| 6,289,326 B1 | 9/2001 | LaFleur |
| D456,587 S | 4/2002 | Kit et al. |
| D462,776 S | 9/2002 | Bain et al. |
| 6,491,298 B1 * | 12/2002 | Criss-Puszkiewicz et al. ........... 273/148 R |
| D478,582 S | 8/2003 | Becker et al. |

(Continued)

*Primary Examiner*—Dmitry Suhol
*Assistant Examiner*—Jason Pinheiro
(74) *Attorney, Agent, or Firm*—Griffiths & Seaton PLLC (57) ABSTRACT

An electronic product display system comprises a housing, a support plate, and a tilt mechanism. The housing includes a pair of side walls defining a cavity and defining an opening to the cavity. The support plate is configured to support an electronic product. The support plate extends between the side walls of the housing and includes a pair of opposite sides mounted to the side walls of the housing via the tilt mechanism. The tilt mechanism is configured to enable the support plate to move relative to the housing between a first position in which the support plate extends within the cavity of the housing generally upward at a non-perpendicular angle relative to a generally horizontal plane, and a second position in which the support plate extends partially out of the cavity generally parallel to the generally horizontal plane.

16 Claims, 4 Drawing Sheets

U.S. PATENT DOCUMENTS

| | | |
|---|---|---|
| 6,698,597 B2 | 3/2004 | Marihugh |
| D505,948 S | 6/2005 | Vrachan et al. |
| D513,905 S | 1/2006 | Lucatello |
| D515,080 S | 2/2006 | Esplo |
| 2002/0107075 A1 | 8/2002 | Stephan |

* cited by examiner

ELECTRONIC PRODUCT DISPLAY SYSTEM

BACKGROUND OF THE INVENTION

Electronic gaming products have emerged in the last two decades as a major form of entertainment. One example of this trend includes video gaming with such products as Playstation® brand and X-box® brand video game consoles, which support playing video games. These game consoles are in high demand, and also enable a retail store to sell accessory items and games to go with the game consoles. Consequently, retail stores expend considerable effort displaying the game consoles to entice purchase of the game consoles and/or their associated games.

However, protecting the video game consoles and video games from theft, damage, or wear and tear can be challenging. Retailers want consumers to be able to see and touch the video game consoles, but do not want consumers to steal them. Moreover, electronic products such as video game consoles are typically in an always-on state and displayed in situations that may not be ideal for longevity of the video game console. Finally, these products must be displayed and secured in a way that still enables a salesperson to access and maintain the video game console.

Accordingly, retailers face ongoing challenges in creatively displaying electronic products, such as video game consoles, while insuring their security and longevity.

SUMMARY OF THE INVENTION

Embodiments of the present invention are directed to an electronic product display system. The display system comprises a housing, a support plate, and a tilt mechanism. The housing includes a pair of side walls defining a cavity and defining an opening to the cavity. The support plate is configured to support an electronic product. The support plate extends between the side walls of the housing and includes a pair of opposite sides mounted to the side walls of the housing via the tilt mechanism. The tilt mechanism is configured to enable the support plate to move relative to the housing between a first position in which the support plate extends within the cavity of the housing generally upward at a non-perpendicular angle relative to a generally horizontal plane, and a second position in which the support plate extends partially out of the cavity generally parallel to the generally horizontal plane.

BRIEF DESCRIPTION OF THE DRAWINGS

Embodiments of the invention will be described with respect to the figures, in which like reference numerals denote like elements, and in which.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the present invention enable display of an electronic product, such as a video game console, within a housing. The video game console is visible for viewing through a transparent cover with the video game console tilted into a first position and accessible for maintenance, after removal of the cover, in a second non-tilted position. A tilt mechanism enables slidable and pivotal movement of a support plate, on which the video game console is mounted, relative to the housing to enable movement between the first position and the second position. The first tilted position places the video game console in a secure location within a cavity of the housing, while keeping the console in a non-vertical position to insure optimal operation of the video game console. The second non-titled position enables access to the cavity of the housing and access to the video game console for maintenance.

Figure 1:
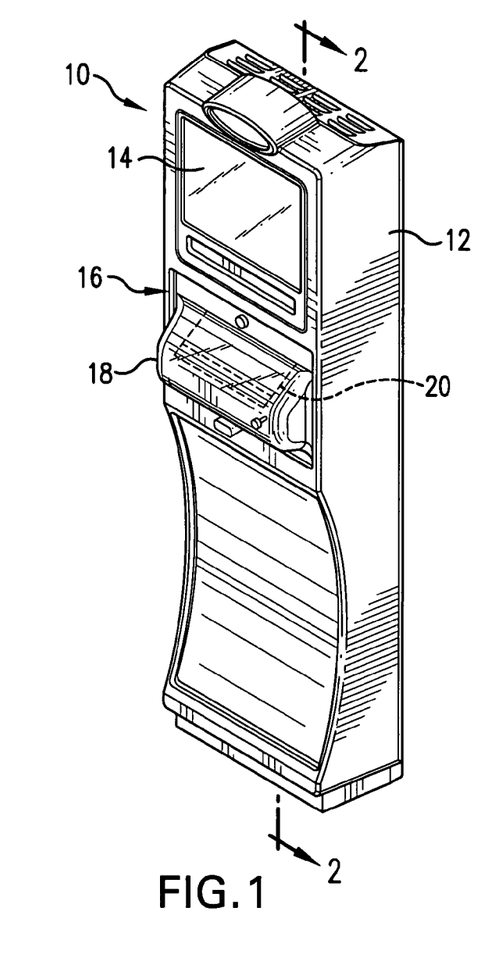
FIG. 1 is a perspective view of an electronic product display system, according to an embodiment of the present invention.

FIG. 1 is a perspective view of an electronic product display system, according to an embodiment of the present invention. As shown in FIG. 1, display system 10 comprises housing or cabinet 12, video monitor 14, product display assembly 16 including transparent cover 18 and electronic product 20. In one embodiment, electronic product 20 is a video game console. Product display assembly 16 supports electronic product 20 within housing 12 to enable a consumer to view electronic product 20 through transparent cover 18 and to simultaneously securely protecting electronic product from theft or damage. Additional components, such as video game hand controllers, may be added to display system 10 to enable further enhance the display of product 20.

Figure 2:
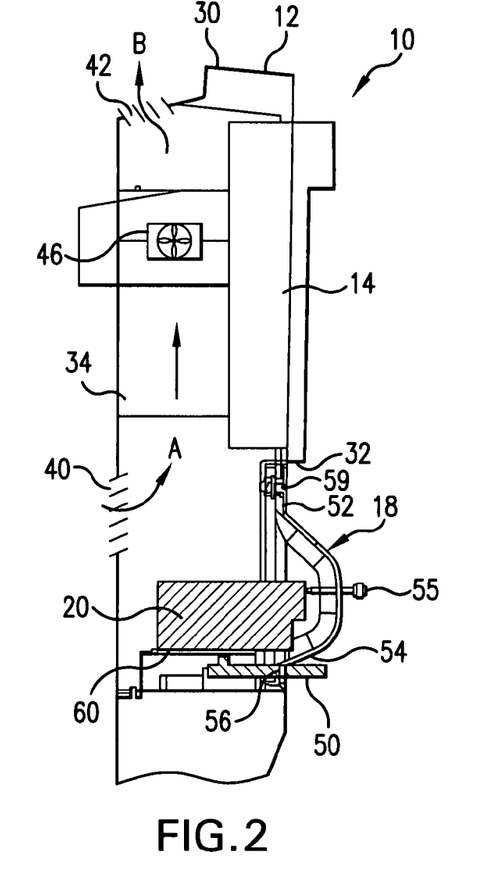
FIG. 2 is a partial sectional view as taken along lines 2-2 of FIG. 1, according to one embodiment of the present invention.

FIG. 2 is a partial sectional view of FIG. 1, illustrating an interior of housing 12 for one embodiment of the present invention. As shown in FIG. 2, display system 10 comprises housing 12, video monitor 14, cover 18, and product 20. This embodiment does not include a tilt mechanism for moving electronic product 20 between a first position and a second position, but does include other features suitable for use in combination with a tilt mechanism and/or to enhance display of electronic product 20.

As shown in FIG. 2, housing 12 comprises top portion 30, front portion 32, and rear portion 34. Rear vent 40 is located on rear portion of housing 12 while top vent 42 is located on top portion of housing 12. Rear vent 40 and top vent 42 are positioned on housing 12 relative to each other to enable air flow for passive flow of heat (generated by electronic product 20) away from electronic product 20 to prolong the longevity of electronic product 20.

In one embodiment, fan 46 is mounted in an interior of housing between rear vent 40 and top vent 42. Fan 46 causes air flow (represented by directional arrow A) from a surrounding environment into the interior of the housing 12 through rear vent 34 and out through top vent 42 (represented by directional arrow B) to carry heat generated by electronic product 20. Accordingly, fan 46 acts an active agent to augment heat dissipation provided by vents 40, 42.

As shown in FIG. 2, electronic product 20 rests in a stationary position on fixed support member 60 for viewing through transparent cover 18. Transparent cover 18 of display system 10 comprises upper flange 52 and lower portion 54 with flange 56, which can be one or more tabs extending from lower portion 54. In one embodiment, lower flange 54 of cover 18 is slidably insertable into a portion of ledge 50 (shown later in association with FIG. 4) while upper flange 52 of cover 18 is releasably locked, via lock 59, relative to front portion 32 of housing 12. In another embodiment, a positioning set-screw 55 extends through cover 18 to provide stabilizing contact against electronic product 20.

To access an interior 130 of housing 12 for maintenance of electronic product 20 and/or its accessories, cover 18 is removed to provide access to electronic product 20 by deactivating lock 59 and then slidably removing lower flange 54 from ledge 50 of housing 12.

Figure 3:
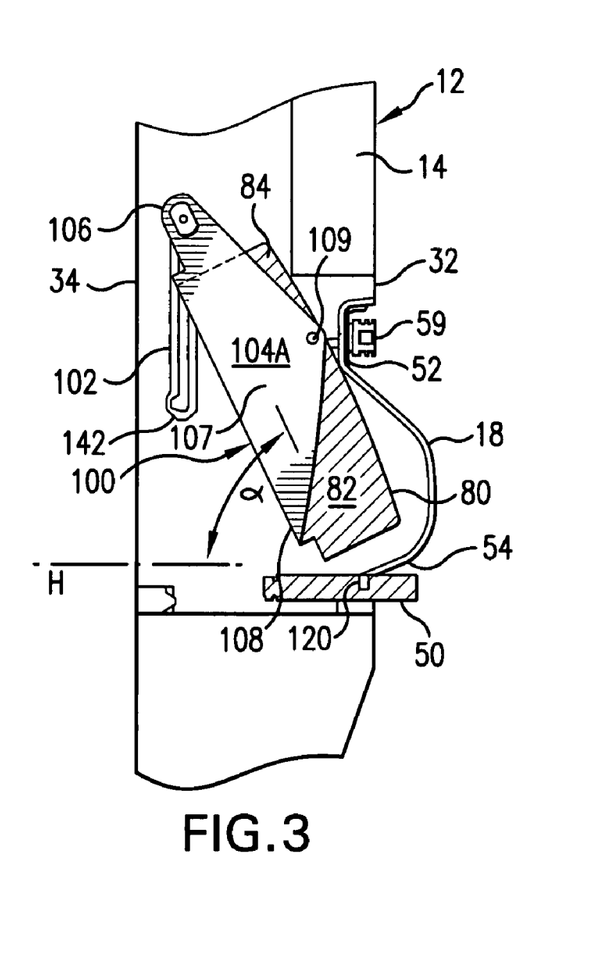
FIGS. 3 and 4 are partial sectional views as taken along lines 2-2 of FIG. 1 of an electronic product display system, according to another embodiment of the present invention.
Figure 4:
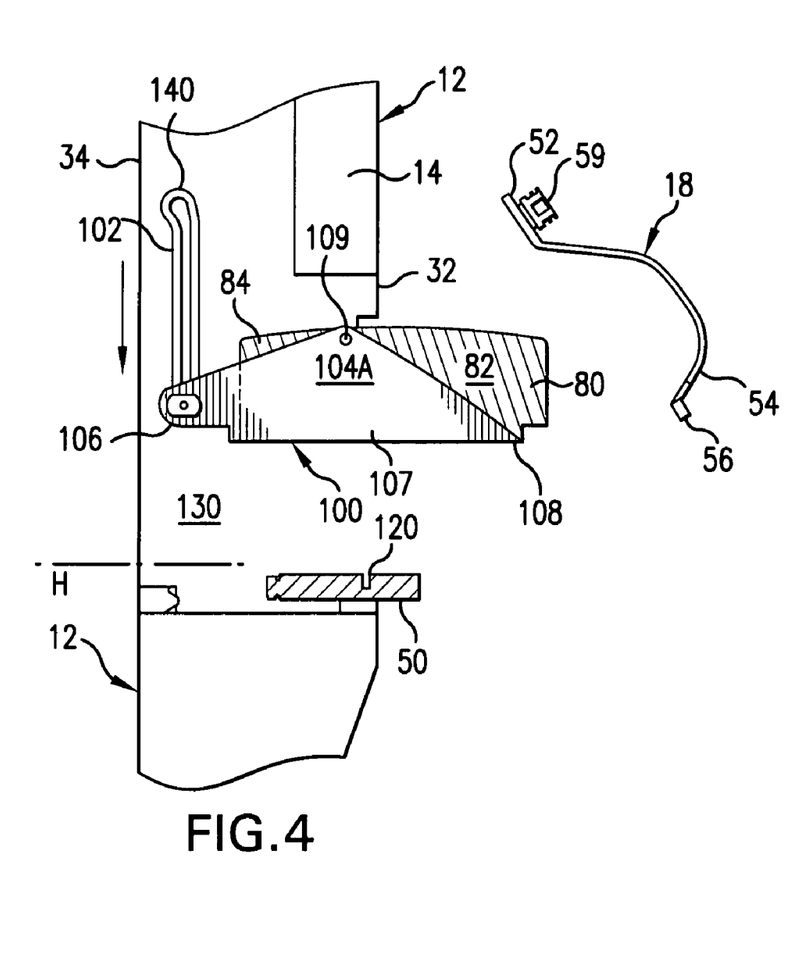

FIGS. 3 and 4 are partial sectional views, schematically illustrating a display system, according an embodiment of the present invention. Housing 12, including cover 18, have substantially the same features and attributes as previously described in association with FIGS. 1-2 except for the introduction of support plate 100 and an associated tilt mechanism which is described in detail in association with FIGS. 3-7.

As shown in FIG. 3, electronic product 80 is removably supported on support plate 100 within an interior 130 (i.e., a cavity) of housing 12. Housing 12 comprises, among other things, slot 102 including an upper portion 140 and a lower portion 142. Support plate 100 comprises side walls 104A, 104B, rear portion 106, midportion 107 with vertex 109, and front portion 108. A rear portion 106 of support plate 104 is pivotally and slidably mounted within slot 102 of housing 12. Midportion 107 of support plate 104 is also pivotally and slidably mounted relative to housing 12 (via vertex 109), as will be described in more detail in association with FIGS. 5-7.

As shown in FIG. 3, support plate 100 is in a first position in which the support plate 100 extends generally upward at a non-perpendicular angle (α) relative to a generally horizontal plane (represented by line H). Rear portion 106 of support plate 100 is disposed at upper portion 140 of slot 102 while the front portion 108 of the support plate 100 extends within the cavity 130 of the housing to maintain the electronic product 20 within housing 20.

In the first position, support plate 100 enables viewing of front portion 82 of electronic product 80 through transparent cover 18 while maintaining product 80 within cavity 130 for security purposes. In addition, in the first position, product 80 is supported by support plate 100 at a non-perpendicular angle (α) relative to a generally horizontal plane (H) to increase the longevity of the electronic product. In particular, by avoiding placement of electronic product 80 in a vertical position (generally perpendicular to the horizontal plane H), this embodiment enables the electronic components of electronic product 80 (e.g. circuitry, power supply, fans, supporting assemblies) to operate under conditions more suited to increase the life of electronic product 80. Fan 46, as well as the passive air flow pathway between rear vent 40 and top vent 42, acts to help maintain the longevity of electronic product 80 within enclosed housing by dissipating heat generated by operation of electronic product 80.

As shown in FIG. 4, support plate 100 is in the second position in which the support plate extends generally parallel to the generally horizontal plane (H) and partially outward the housing 12 to enable access to the cavity 130 below the support plate 100, provide convenient access to front portion 82 of electronic product 80. In this second position, maintenance or manipulation of controls of electronic product 80 can be conveniently performed while easy access to accessories (such as video game cartridges, DVDs, hand controllers, etc) stored within cavity 130 is also provided. In this second position, rear portion 106 of support plate 100 is disposed in lower portion 142 of slot 102. Variations of this embodiment includes the second position of support plate 100 being positioned at small angles relative to generally horizontal plane (H), so that support plate 100 need not be strictly horizontal in the second position for allowing access to cavity 130 and access to front portion 82 of electronic product 80.

As shown in FIG. 4, in order to pivot support plate 100 from the first position into the second position, cover 18 is removed from housing 12 by deactivating lock 59 and sliding lower flange 56 out from slot 120 of ledge 50 of housing 12.

As illustrated in FIGS. 3-4, midportion 107 of support plate 100 pivots relative to housing 12, and slides a relatively small distance along a track or slot to enable much larger movement of rear portion 108 of support plate, thereby enabling significant tilting of support plate 100 (and electronic product 80) within the relatively small confines of cavity 130 within housing 12. The relatively stationary position of midportion 107 of support plate 100 when support plate 100 is in either the first position or the second position is described and illustrated in more detail in association with FIGS. 5-7.

Figure 5:
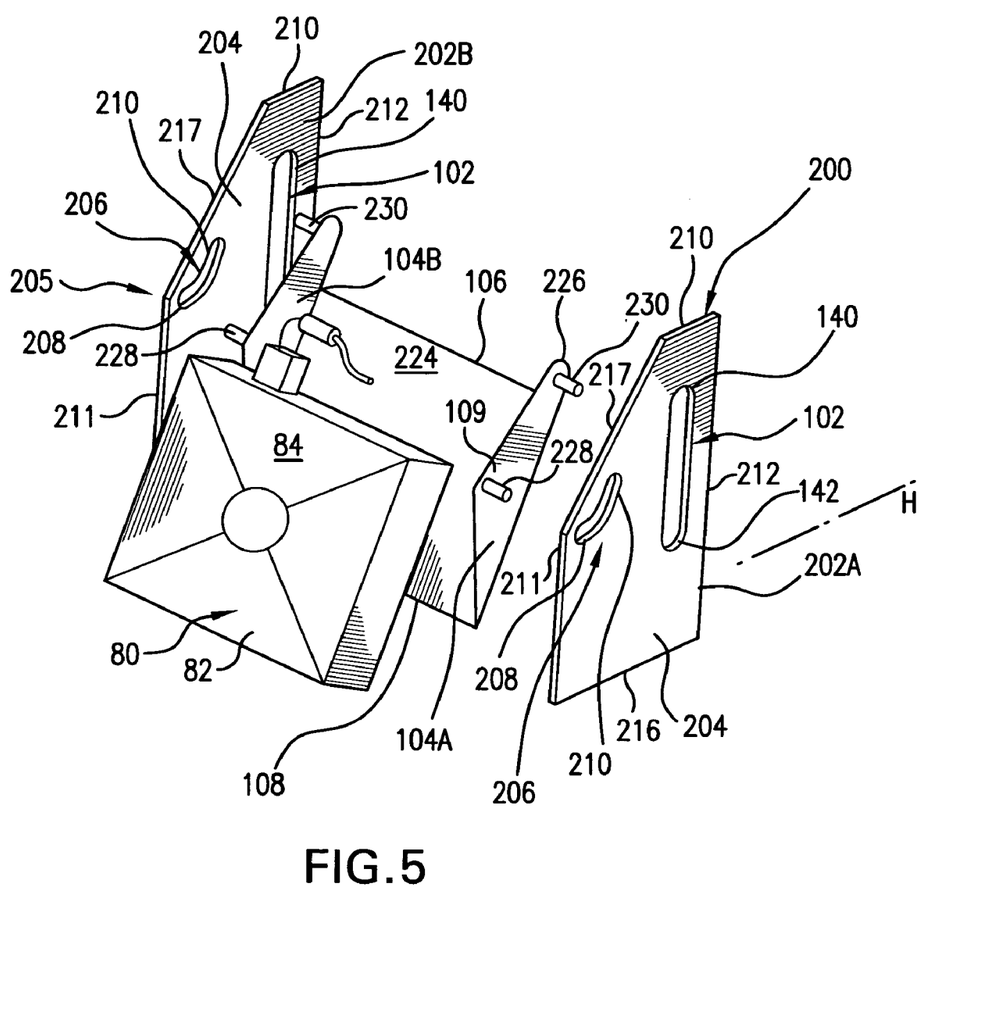
FIG. 5 is an exploded view of components of display assembly, according to an embodiment of the present invention.

FIG. 5 is an exploded perspective view of display assembly 200 of display system 10. As shown in FIG. 5, display assembly 200 comprises side walls 202A, 202B of housing 12, support plate 100 and tilt mechanism 205. Tilt mechanism 205 comprises certain components of the support plate 100 and side walls 202A, 202B, as will be described more fully herein.

Side walls 202A, 202B are disposed within cavity 130, and further define cavity 130 of housing 12. Moreover, side walls 202A, 202B form a vertical portion of housing 12 or are mounted in housing 12 in a vertically oriented position. Support plate 100 extends between the pair of side walls 202A, 202B of housing and is mounted to side walls 202A, 202B via tilt mechanism 205.

Each side wall 202A, 202B comprises body 204, first angled slot 206, and second generally vertical slot 102, as well as front portion 211, rear portion 212, top portion 214, bottom portion 216, and angled portion 217. First angled slot 206 is adjacent front portion 211 of side wall 202A, 202B and includes an upper portion 210 and a lower portion 208. Upper portion 210 forms a generally obtuse angle relative to the lower portion 208. Upper portion 210 of first angled slot 206 is positioned in closer proximity to the second generally vertical slot 102 than the lower portion 208 while lower portion 208 extending generally parallel to a generally horizontal plane (represented by line H). Second generally vertical slot 102 comprises upper portion 140 and lower portion 142.

First angled slot 206 and second generally vertical slot 102 are each shaped and sized, as well as positioned relative to each other on side wall 202A, 202B to enable pivotal and slidable movement of support plate 100 relative φ side walls 202A, 202B, as will be described more fully in association with FIGS. 6-7.

Support plate 100 comprises central portion 224 extending between side portions 104A, 104B, which extend upward on opposite sides of and generally perpendicular to central portion 224. As previously described, support plate 100 also includes front portion 108, midportion 107 with vertex 109, and rear portion 106. Support plate 100 is sized and shaped to extend laterally between opposing side walls 202A, 202B of housing 12. Central portion 224 of support plate 100 is sized and shaped to support electronic product 80, such as a video game console. Side portions 104A, 104B each support a first protrusion 228, such as a pin, at midportion 107 of support plate 100 and support a second protrusion 230, such as a pin, at vertex 226 adjacent rear portion 106 of support plate 100.

Tilt mechanism 205 comprises the combination of a first pivot mechanism and a second pivot mechanism, and controls tilting of support plate 100 relative to side walls 202A, 202B for moving electronic product 80 between a first position and a second position. In the first position, the support plate 100 extends generally upward at a non-perpendicular angle (α) relative to a generally horizontal plane (H), and in the second position, the support plate extends generally parallel to the generally horizontal plane (H).

First pivot mechanism of tilt mechanism 205 enables pivotal and slidable movement of midportion 107 of support plate 100 relative to the front portion 211 of each side wall 202A, 202B. while second pivot mechanism of tilt mechanism 205 enables pivotal and slidable movement of rear portion 106 of support plate 100 relative to the rear portion 212 of each side wall 202A, 202B. The first pivot mechanism is defined by the first protrusion 228 of the respective side portions 104A, 104B of support plate 100 and by the first angled slot 206 of the respective side walls 202A, 202B of housing 12. First angled slot 206 is sized and shaped to maintain slidable movement of first protrusion 228 within, and along, first angled slot 206.

The second pivot mechanism of tilt mechanism 205 is defined by the second protrusion 230 of the respective side portions 104A, 104B of support plate 100 and by the second generally vertical slot 102 of the respective side walls 202A, 202B of housing 12. Second generally vertical slot 102 is sized and shaped to maintain slidable movement of second protrusion 230 within, and along, second generally vertical slot 102.

Figure 6:
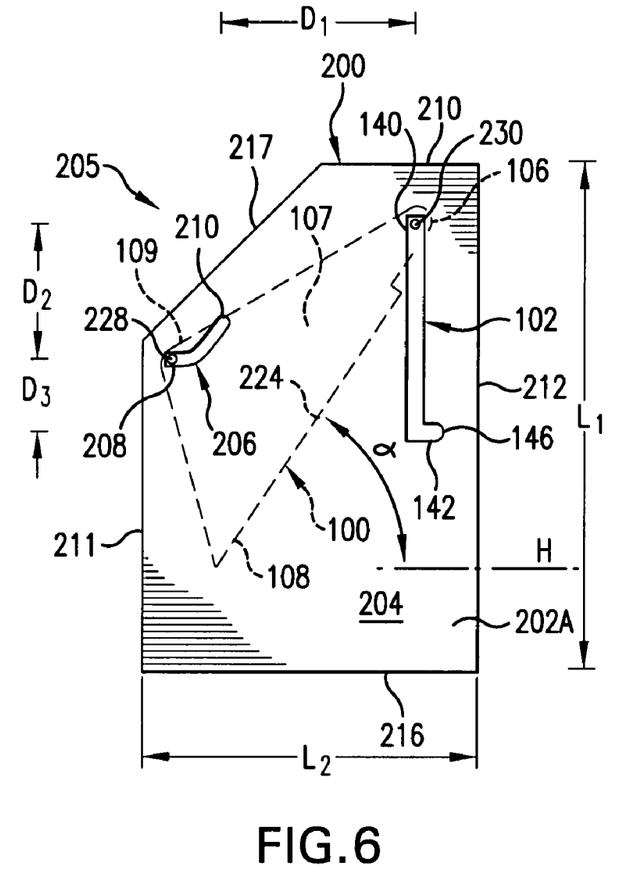
FIGS. 6 and 7 are side views schematically illustrating a display assembly with a support plate in a first position and a second position, respectively, according to an embodiment of the present invention.
Figure 7:
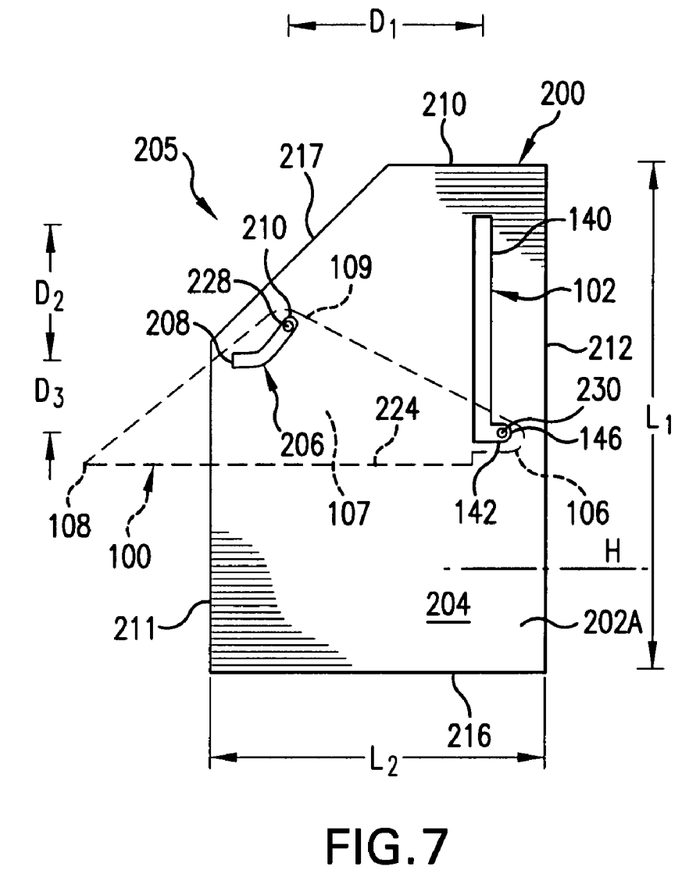

FIGS. 6 and 7 schematically illustrate operation of tilt mechanism 205 and are side views of support plate 100 (shown in dashed lines) moving relative to side wall 202A (or 202B) of housing 12 between a first position in FIG. 6 and in a second position in FIG. 7. FIG. 6 generally corresponds to the features and attributes of display system 10 described and illustrated in association with FIG. 3 while FIG. 7 generally corresponds to the features and attributes of display system 10 described and illustrated in association with FIG. 4.

As shown in FIG. 6, in the first position, the support plate 100 extends generally upward at a non-perpendicular angle (α) relative to a generally horizontal plane (H), and in the second position shown in FIG. 7, the support plate 100 extends generally parallel to the generally horizontal plane (H).

As shown in FIGS. 6 and 7, the first pivot mechanism and the second pivot mechanism of tilt mechanism 205 are spaced and positioned relative to each other so that in the first position of the support plate 100, the first protrusion 228 is positioned in a lower portion 208 of the first angled slot 206 and the second protrusion 230 is positioned in an upper portion 140 of the second generally vertical slot 102. In addition, the first pivot mechanism and the second pivot mechanism of tilt mechanism 205 are spaced and positioned relative to each other so that in the second position of the support plate 100, the first protrusion 228 is positioned in an upper portion 210 of the first angled slot 206 and the second protrusion 230 is positioned in a lower portion 142 of the second generally vertical slot.

As shown in FIG. 7, the first angled slot 206 and the second generally vertical slot 102 of the side walls 202A, 202B of the housing 12 are spaced from each other to cause, during movement of the support plate 100 between the first position and the second position, the first profusion 228 to slide along the first angled slot 206 between the upper portion 210 and the lower portion 208 of the first angled slot 206 and to pivot relative to the first angled slot 206, and the second protrusion 230 to slide along the second generally vertical slot 102 between the upper portion 140 and the lower portion 142 of the first angled slot 206 and pivots relative to the second generally vertical slot 102.

In one embodiment, first angled slot 206 is spaced laterally from second slot 102 by a distance D1. In addition, first angled slot 206 is spaced vertically a distance D2 from upper portion 140 of second slot 102 and spaced vertically a distance D3 from lower portion 142 of second slot 102. Side walls 202A, 202B each have a vertical height of L1 and a depth (generally corresponding to a depth within cavity 130) of L2.

The shapes and sizes of first angled slot 206 and/or second generally vertical slot 102, as well as their relative position on side wall 202A, 202B, can be modified to accommodate differently sized support plates 108 and to achieve different non-perpendicular angles (α) of tilting of support plate 100 relative to side walls 202A, 202B. Moreover, the available space within cavity 130 of housing 12 is another parameter affecting the selection of a non-perpendicular angle (α) of tilting of support plate 100. In one embodiment, non-perpendicular tilting angle (α) of support plate 100 relative to generally horizontal plane (H) is selected to be an angle falling within a range from 20 to 80 degrees. In other embodiments, non-perpendicular tilting angle (α) of support plate 100 comprises an angle within a range from 55 to 70 degrees. In another embodiment, non-perpendicular tilting angle (α) of support plate 100 comprises an angle of approximately 65 degrees.

In addition, in some embodiment, the ends of second generally vertical slot 102 at upper portion 140 and lower portion 142 include curved portions and/or recessed shapes (e.g. recess 146) to further enable pivoting of support plate 100, as well as to enable releasably securing of support plate 100 in a desired position (such as the second position shown in FIG. 7).

Embodiments of the present invention enable display of an electronic product within a housing in a manner that enables viewing through a transparent cover and positioning of the electronic product within the housing between a first tilted position and a second non-tilted position. The first tilted position places the video game console in a secure location within a cavity of the housing, while keeping the console in a non-vertical position to insure optimal operation of the video game console. The second non-titled position enables access to the cavity of the housing and access to the video game console for maintenance. Additional features of the housing such as a passive air flow pathway, and active air flow agent (e.g., a fan) further enhance care of the electronic product. The transparent cover also provides a mechanism to prevent unwanted access to the electronic product and preventing dust migration into an interior of the housing.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An electronic product display system comprising:
a housing defining a cavity for containing an electronic product and including a pair of side walls disposed within the cavity; and
a support plate configured to support the electronic product, the support plate extending between the side walls of the housing and including a pair of opposite sides mounted to the side walls of the housing via a tilt mechanism,
wherein the tilt mechanism is configured to enable the support plate to move relative to the housing between a first position in which the support plate extends generally upward within the cavity at a non-perpendicular angle relative to a generally horizontal plane, and a second position in which the support plate extends generally parallel to the generally horizontal plane;
wherein in the first position, a front portion of the support plate extends within the cavity of the housing to maintain the electronic product within the cavity, and in the second position, the front portion of the support plate extends partially outward from the housing through an opening in the housing to enable access to the cavity below the support plate; and
further wherein:
the tilt mechanism comprises a first slidable pivot mechanism positioned at a midportion of the support plate and a front portion of the side walls of the housing, and a second slidable pivot mechanism is positioned at a rear portion of the support plate and a rear portion of the side walls;
the first slidable pivot mechanism comprises: a pair of first protrusions disposed on the opposite sides of the support plate at the midportion of the support plate and extending through a pair of generally arcuate slots in the front portion of each of the side walls of the housing, each generally arcuate slot being generally convex toward the second slidable pivot mechanism, and the first protrusions are slidably movable through, and pivotal relative to, respective ones of the generally arcuate slots of the side walls of the housing;
the second slidable pivot mechanism comprises: a pair of second protrusions disposed on the opposite sides of the support plate at the rear portion of the support plate and extending through a pair of generally vertical slots in the rear portion of each of the side walls of the housing, and the second protrusions are slidably movable through, and pivotal relative to, respective ones of the generally vertical slots of the side walls of the housing; and
the first slidable pivot mechanism and the second slidable pivot mechanism are spaced and positioned relative to each other so that in the first position of the support plate, the pair of first protrusions is positioned in a lower portion of the pair of generally arcuate slots and the pair of second protrusions is positioned in an upper portion of the pair of generally vertical slots, and in the second position of the support plate, the pair of first protrusions is positioned in an upper portion of the pair of generally arcuate slots and the pair of second protrusions is positioned in a lower portion of the pair of generally vertical slots.

2. The display system of claim 1 wherein the pair of generally arcuate slots and the pair of generally vertical slots of the side walls of the housing are spaced from each other to cause, during movement between the first position and the second position of the support plate, the first protrusions to slide along the respective ones of the generally arcuate slots between the upper portion and the lower portion of the respective ones of the generally arcuate slots and to pivot relative to the respective ones of the generally arcuate slots, and the second protrusions to slide along the respective ones of the generally vertical slots between the upper portion and the lower portion of the respective ones of the generally vertical slots and to pivot relative to the respective ones of the generally vertical slots.

3. The display system of claim 1 wherein the support plate comprises a central support surface extending between the opposite sides of the support plate, and each of the opposite sides of the support plate comprising a side portion that extends upward generally perpendicular relative to the central support surface, with each side portion of the support plate supporting one of the pair of first protrusions of the first slidable pivot mechanism.

4. The display system of claim 1 and further comprising:
a transparent cover removably mounted on the housing and positioned to extend across the opening of the housing to prevent access to the cavity.

5. The display system of claim 4 wherein the transparent cover comprises a bottom portion removably insertable into a receiving portion of the housing and a top portion configured for selective locking relative to the housing when the bottom portion of the transparent cover is inserted into the housing, wherein the transparent cover is configured to be lockable relative to the housing when the support plate is in the first position, and configured to be unlocked and removed from the housing when the support plate is moved into the second position.

6. The display system of clam 1 wherein the housing comprises a rear portion and a top portion, wherein each of the rear portion and the top portion includes a vent to enable passive flow of heat from an interior of the housing out through the vent in the top portion of the housing.

7. The display system of claim 6 and further comprising a fan mounted within the interior of the housing and positioned between the vent in the top portion and the vent in the rear portion to cause active air flow through the interior of the housing from the vent in the rear portion to the vent in the top portion.

8. The display system of claim 1 and further comprising: a video display monitor disposed on an exterior surface of the housing above, and spaced from, the support plate.

9. The display system of claim 1 wherein the electronic product comprises a video game console.

10. A method of displaying an electronic product, the method comprising:
supporting the electronic product within a housing upon a support surface of a support plate;
positioning a transparent cover to extend over an opening of the housing to enclose the electronic product and the support surface within an interior of the housing;
positioning the support surface in a first position in which the electronic product extends generally upward within the interior of the housing at a non-perpendicular angle relative to a generally horizontal plane;
periodically removing the transparent cover from the housing, and maneuvering the support surface to a second position in which the electronic product extends generally parallel to the generally horizontal plane and partially out of the interior of the housing, thereby enabling access to the interior of the housing below the support surface; and providing a tilt mechanism including a first slidable pivot mechanism positioned at a midportion of the support plate and a front portion of side walls of the housing, and a second slidable pivot mechanism positioned at a rear portion of the support plate and a rear portion of the side walls;

wherein:

the first slidable pivot mechanism comprises: a pair of first protrusions disposed on opposite sides of the support plate at the midportion of the support plate and extending through a pair of generally arcuate slots in the front portion of each of the side walls of the housing, each of the generally arcuate slots is generally convex toward the second slidable pivot mechanism, and each of the first protrusions are slidably movable through, and pivotal relative to, respective ones of the generally arcuate slots of the side walls of the housing;

the second slidable pivot mechanism comprises: a pair of second protrusions disposed on the opposite sides of the support plate at the rear portion of the support plate and extending through a pair of generally vertical slots in the rear portion of each of the side walls of the housing, the second protrusions being slidably movable through, and pivotal relative to, respective ones of the generally vertical slots of the side walls of the housing;

the first slidable pivot mechanism and the second slidable pivot mechanism are spaced relative to each other; and positioning the support surface in the first position includes positioning the pair of first protrusions in a lower portion of the pair of generally arcuate slots and the pair of second protrusions in an upper portion of the pair of generally vertical slots; and maneuvering the support surface to the second position includes moving the pair of first protrusions to an upper portion of the pair of generally arcuate slots and moving the pair of second protrusions to a lower portion of the pair of generally vertical slots.

11. The method of claim 10 and farther comprising: maneuvering the support surface into the first position, and reinstalling the transparent cover across the opening of the housing.

12. The method of claim 11 wherein positioning the support surface in the first position includes elevating the rear portion of the support plate above the midportion of the support plate, and maneuvering the support surface to the second position includes locating the rear portion of the support plate below the midportion of the support plate.

13. A display system comprising:

means for supporting a video game console within an interior of a housing;

means for blocking access to the interior of the housing while permitting visual access to the video game console; and means for maneuvering the video game console between a first position in which the video game console extends within the interior of the housing in a non-vertical, upwardly tilted orientation and a second position in which the video game console extends partially out of the interior of the housing in a generally horizontal orientation;

wherein:

the means for maneuvering the video game console comprises a pivot means configured to enable slidable pivoting movement of the means for supporting relative to the interior of the housing, the pivot means including a first slidable pivot mechanism positioned at a midportion of the means for supporting and a front portion of the housing, and a second slidable pivot mechanism positioned at a rear portion of the means for supporting and a rear portion of the housing;

the first slidable pivot mechanism comprises a pair of first protrusions disposed on opposite sides of the midportion of the means for supporting and extending through a first set of slots in the front portion of the housing, wherein the first set of slots is curvilinear and generally convex toward the second slidable pivot mechanism, and wherein the first protrusions are slidably movable through, and pivotal relative to, the first set of slots; and the second slidable pivot mechanism comprises a pair of second protrusions disposed on opposite sides of the rear portion of the means for supporting and extending through a second set of slots in the rear portion of the housing, wherein the second set of slots are generally linear and vertical, and wherein the second protrusions are slidably movable through, and pivotal relative to, the second set of slots;

the first slidable pivot mechanism and the second slidable pivot mechanism are spaced and positioned relative to each other so that in the first position of the means for supporting, the pair of first protrusions is positioned in lower portions of the first set of slots and the pair of second protrusions is positioned in upper portions of the second set of slots, and in the second position of the means for supporting, the pair of first protrusions is positioned in upper portions of the first set of slots and the pair of second protrusions is positioned in lower portions of the second set of slots; and the pair of first protrusions has a first total travel distance within the first set of slots, and the pair of second protrusions has a second total travel distance within the second set of slots, the first total travel distance being less than about half of the second total travel distance.

14. The display system of claim 13 wherein the means for supporting comprises a support plate, the means for blocking access comprises a transparent cover removably mountable over an opening of the housing adjacent the interior of the housing, and the pivot means is configured to enable slidable pivoting movement of the support plate relative to the interior of the housing.

15. The electronic product display system of claim 1, wherein each generally arcuate slot in the pair of generally arcuate slots has a first total travel distance, and each generally vertical slot in the pair of generally vertical slots has a second total travel distance, wherein the second total travel distance is more than approximately twice the first total travel distance.

16. The method of claim 10, further including:

maneuvering the support surface into the first position and reinstalling the transparent cover across the opening of the housing;

wherein, in the first position, the rear portion of the support plate is elevated above the midportion of the support plate and the first protrusions are seated at upper limits of the respective ones of the generally arcuate slots, and in the second position, the rear portion of the support plate is located below the midportion of the support plate and the first protrusions are seated at lower limits of respective ones of the generally arcuate slots.

* * * * *